United States Patent [19]

Blum

[11] 4,437,160

[45] Mar. 13, 1984

[54] PHOTON EMISSION IMAGING APPARATUS AND METHOD

[76] Inventor: Alvin S. Blum, 2350 Del Mar Pl., Fort Lauderdale, Fla. 33301

[21] Appl. No.: 173,962

[22] Filed: Jul. 31, 1980

[51] Int. Cl.³ .............................................. G01T 1/20
[52] U.S. Cl. ................................... 364/414; 364/571; 250/252.1; 382/41
[58] Field of Search ............... 364/414, 515, 518, 571; 250/252, 363 R, 363 S, 252.1; 382/41

[56] References Cited

U.S. PATENT DOCUMENTS

| | | | |
|---|---|---|---|
| 3,878,373 | 4/1975 | Blum | 364/414 |
| 4,151,416 | 4/1979 | Richey et al. | 250/363 S |
| 4,179,607 | 12/1979 | Lange et al. | 250/363 S |
| 4,200,934 | 4/1980 | Hofmann | 364/571 |
| 4,223,221 | 9/1980 | Gambini et al. | 250/363 S |
| 4,223,388 | 9/1980 | Nishikawa et al. | 364/571 |
| 4,228,515 | 10/1980 | Genna et al. | 364/571 |
| 4,281,382 | 7/1981 | Knoll et al. | 364/414 |
| 4,298,944 | 11/1981 | Stoub et al. | 364/571 |

Primary Examiner—Gary Chin
Attorney, Agent, or Firm—Alvin S. Blum

[57] ABSTRACT

System for imaging the distribution of photon emitting material from a distributed radiation source including a scintillator, photodetectors viewing the scintillator, signal processor, data processing, storage and display. Method of locating a plurality of radiation sources and providing an improved image of their distribution by comparison of radiation responses from known locations with radiation responses from unknown locations. Calibration method for recording characteristic response data from known locations using uniformly irradiating source. Sorting and ordering process of data processing simplification. Structures enhancing position signals at the expense of response uniformity.

14 Claims, 5 Drawing Figures

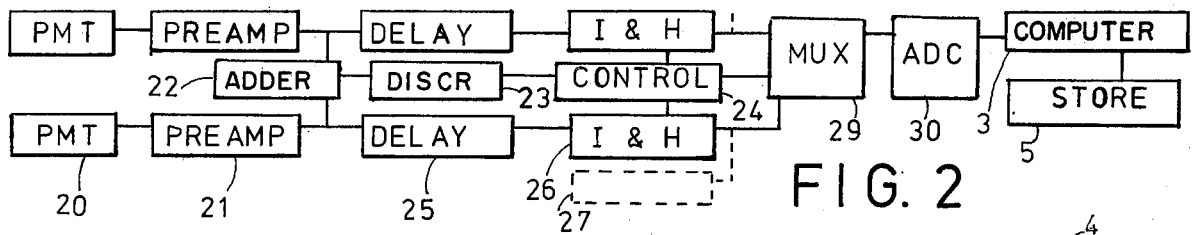
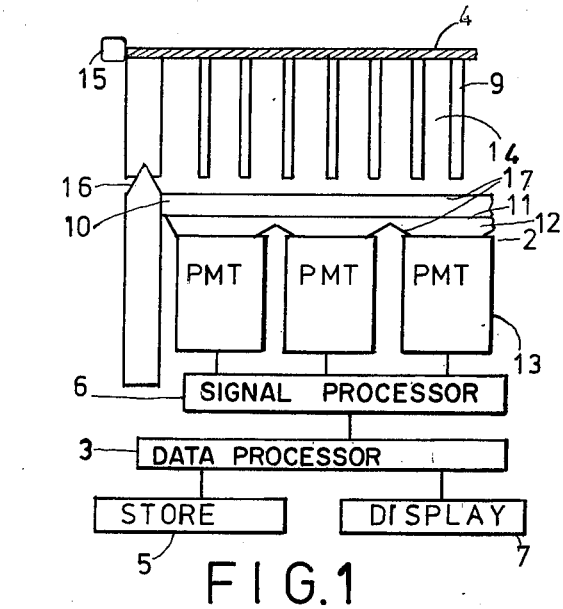
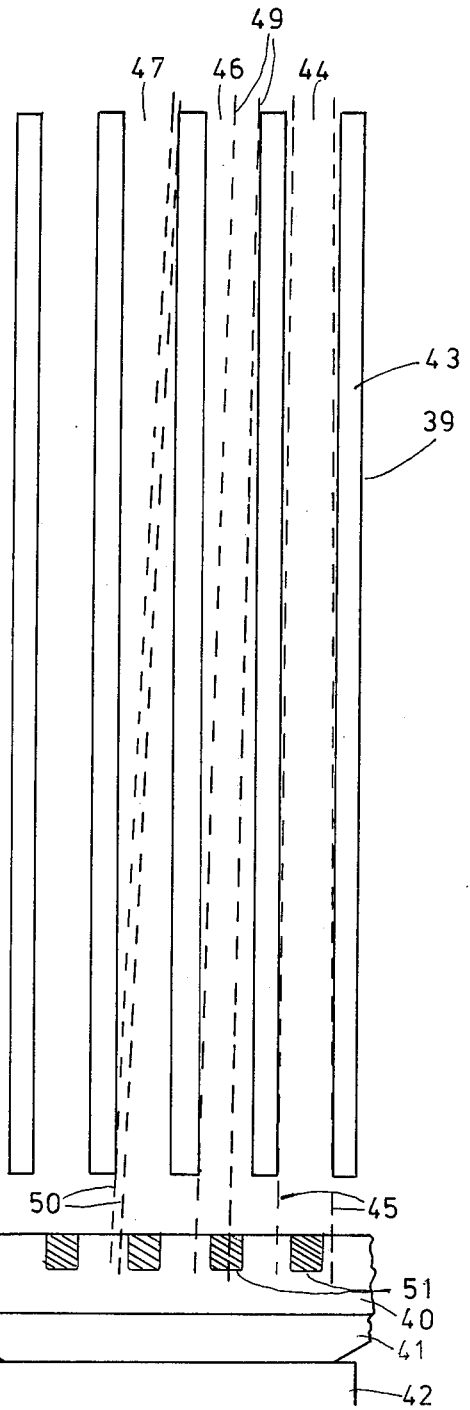
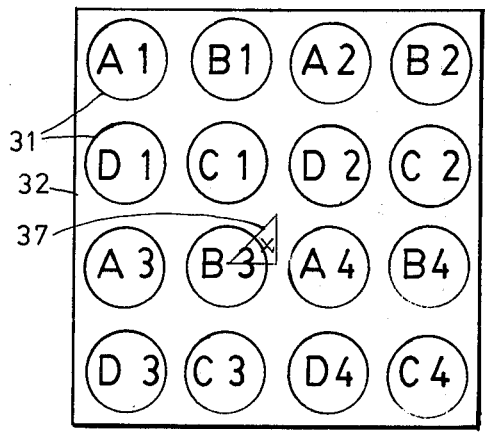
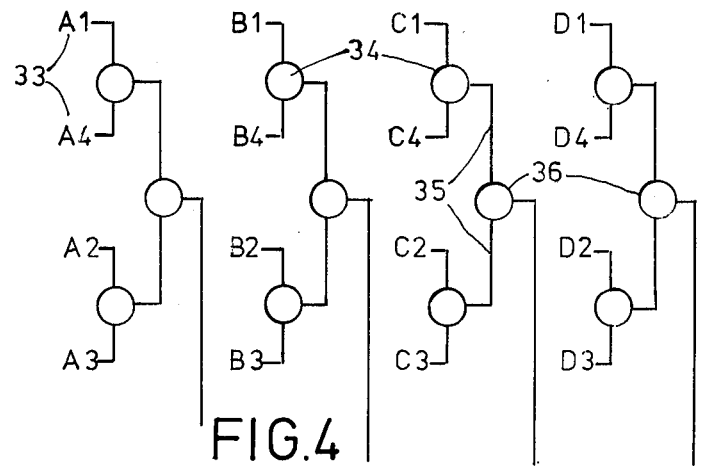

PHOTON EMISSION IMAGING APPARATUS AND METHOD

BACKGROUND OF THE INVENTION

1. Field of the Invention

This invention relates to radiation detection and imaging devices and methods for locating each of a plurality of photon emitting sources, and more particularly to instrumentation for surveying the disposition of a distributed radiation source such as a radioactive pharmaceutical in the human body and displaying a more accurate image of said distribution by more precise comparison of radiation responses from unknown locations with radiation responses from known locations.

2. Description of the Prior Art

Tobias U.S. Pat. No. 2,779,876 provides photodetectors disposed adjacent a scintillator for locating the image point in the scintillator after photon emission by determining which phototube provides a responsive signal. Anger U.S. Pat. No. 3,011,057 improved resolution to an area smaller than a phototube by spacing the phototubes a moderate distance from the scintillator so that several phototubes may report each light flash. The electrical signals from the phototubes are combined in a coordinate system relative to their positions over the scintillator and report the approximate location of the scintillation in the crystal but not the location of the radiation source. Blum U.S. Pat. No. 3,878,373 provides locating of the radiation source in the image by comparing the phototube signal pattern caused by the scintillation from the source in unknown location with signal patterns generated when sources are in known locations.

SUMMARY OF THE PRESENT INVENTION

Photon emission imaging apparatus responsive to individual radiation stimuli includes a collimator, at least one scintillator in the path of radiation emissions from a distributed radiation source, a plurality of photodetectors for viewing each scintillator, and signal processor; data store, and data processor interconnected with one another and connected to the photodetectors. A display is connected to the data processor to provide an improved image of the distribution of the source. A calibration system is used to provide the device with radiation emission response data and location data from radiation emissions at a plurality of known locations for use by the data processor to derive more accurately the location of each of a plurality of distributed radiation emitting sources of unknown location in a body. The calibration system may include a sheet of uniformly distributed radioactive material and apparatus for applying this to the outer face of the collimator. The collimator is a radiation opaque plate with holes therethrough. Apparatus for moving the sheet source during calibration data acquisition so as to average out any lack of uniformity in the source may also be provided. Each photon of radiation which passes through a collimator hole and is absorbed by the scintillator crystal emits a light flash seen by the phototubes. Each phototube responds with an electrical pulse proportional to the amount of light it sees. The sum of these signs (integral pulse height) may be recorded. It will be generally proportional to the incident photon energy and may be used to select only certain photon energies for improved imaging. The pattern of the individual phototube pulse amplitudes (signal pattern) will be indicative of the approximate center of light resulting from the incident photon and the particular collimator hole through which it passed. It is further indirectly assumed that the source of that photon is located somewhere in the body above that collimator hole. It is an object of the invention to provide an improved calibration system for storing signal patterns and integral pulse heights together with known radiation source locations for comparison with unknown signal patterns. It is an object of the invention to provide an improved system to more accurately locate the radiation emitting source to improve image resolution.

Scintillation cameras in clinical use have adequate intrinsic resolution, i.e. resolution of sources right at the face of the scintillation crystal. Their greatest weakness is in poor system resolution and poor image quality with the collimator in place and the source deep within the body of the patient and a considerable distance from the collimator face. It is an object of the invention to overcome this weakness.

In the usual case of a lead collimator having parallel holes perpendicular to the crystal face, only photons traveling in a direction perpendicular to the crystal face can pass through the collimator holes without being stopped by lead septa. If the collimator were completely efficient, only exactly perpendicular rays would strike the crystal. The distribution of scintillations within the crystal would be a true planar projection of the distribution of photon emitter within the subject. The measured radiation (sensitivity) would approximately follow the inverse square law and resolution would deteriorate only slowly with increased distance from the collimator. With real collimators, sensitivity remains relatively unchanged with distance and resolution deteriorates rapidly with distance. Both effects have a common cause. The number of "true" (i.e. perpendicular) rays reaching the crystal through collimator holes falls as the source is moved away from the collimator face and the number of "false" (i.e. non perpendicular) rays reaching the crystal through collimator holes increases. Consider a point source on the axis of a collimator hole at the surface of the collimator. Rays from that source which reach the crystal through that hole subtend a certain solid angle; these may be considered "true" rays. As the source moves a distance along the axis away from the collimator, the solid angle gets smaller and the inverse square law holds. However, as the distance increases, more rays from the source can pass through adjacent holes. Because these add to the other rays, the total rays striking the crystal (sensitivity) is increased and the inverse square law no longer holds. These are "false" rays since they misrepresent the location of the source. And the more distant the collimator hole they pass through, the more they degrade system resolution. Septal penetration contributes further to this image degradation. It is an object of the invention to provide apparatus, a calibration system, and data processor to identify and discard certain of these false rays from the imaging process to improve image quality by software manipulations. When sensitivity is desired over resolution these rays can be included in the image and when resolution is desired over sensitivity they can be excluded from the image. Most of the true rays tend to strike the crystal in a region directly beneath the collimator hole and more are central then peripheral. Whereas, many of the false rays strike the crystal under the septum or at the periphery of the collimator hole.

This distinction can be accentuated by spacing the collimator away from the crystal an optimum distance which will be related to collimator geometry. Collimator geometry can also be optimized to accentuate this distinction such as by using thicker septa, and larger and fewer holes than are often employed. Calibration requires the selective storage of radiation response data such as pulse height and signal patterns from source material in known locations such as over the center of collimator holes.

In one calibration embodiment at least one small source is moved to the center of each collimator hole in turn and radiation emission response data are acquired together with source location information. In another embodiment a mosaic of sources having a point source corresponding to every collimator hole location is positioned over the collimator so that the sources and the center of the collimator holes are in registry. This mosaic may be prepared by a photolithographic process from the collimator itself.

In another calibration embodiment, a distributed sheet source of radioactive material is applied to the collimator face while radiation emission response data are acquired. Each signal pattern is related to source material over a particular collimator hole by a data process so that the effect is similar to an individual source centered over each collimator hole in turn. Many of the responses may be discarded as not being representative of source over a hole.

The complete pattern, pulse height and source location for every calibration scintillation may be stored in a calibration memory. Unknown signal patterns may be compared with every calibration pattern. To simplify, accelerate and reduce the data handling task, and improve resolution the invention provides several processes. Those calibration patterns least representative of acceptable source locations may be determined by their frequency of occurrence and discarded. This would be the case with Compton events within the crystal. Each pattern may be reduced in size by a sorting process to discard individual signals from photodetectors remote from the scintillation by comparing signal amplitudes and discarding the smaller ones. Thereby 64 phototube patterns may be reduced to 6 phototube patterns, for example. At the same time, the signals may be ordered by size. The resulting processed pattern now represents only the phototubes proximal to the radiation and the signals are listed in descending order of signal amplitude. The sorted and ordered calibration patterns together with their pulse height value and collimator hole location are arranged in calibration memory wherein the address in memory is related to the order of the pattern. The address may also be related to the amplitude of certain signals. This process reduces the number of calibration patterns which must be searched or compared to an unknown pattern to find a location for the unknown source. By sorting and ordering the unknown pattern prior to matching, fewer signals make up the pattern and only the patterns in the calibration memory at that address have a similar order and magnitude that need to be compared for matching and thereby possibly locating the source of the unknown radiation. Relative amplitudes rather than absolute amplitudes may be used by dividing each signal by the sum of signals. This overcomes some variations in efficiency of conversion from photon energy to photodetector signals.

It is an object of the invention in its broadest aspect to provide imaging apparatus and method capable of the maximum utilization of the radiation from the patient for supplying diagnostic images. For complying with these and other objects, the camera of the invention has a number of particular features which should preferably be employed in combination although each of them is useful separately without departure from the scope of the invention.

BRIEF DESCRIPTION OF THE DRAWINGS

FIG. 1 shows a photon imaging apparatus.

FIG. 2 shows a signal processing system of the invention.

FIG. 3 shows the signals on a square array of photomultiplier tubes.

FIG. 4 shows a sorting and ordering process.

FIG. 5 shows a portion of detector with collimator.

DESCRIPTION OF PREFERRED EMBODIMENTS OF THE INVENTION

FIG. 1 shows photon imaging apparatus of the invention including a photon detector 2 for detecting radiation emissions, interconnected signal processor 6 for processing electrical signals from detector 2 and data processor 3 that may be a computer device for collecting, storing, analyzing and displaying radiation response data and radiation source location and image data. A calibration source 4 is used in conjunction with photon detector 2 to provide radiation emission response data from known locations to data processor 3.

The response data from a plurality of known locations together with the location data from each location is processed through data processor 3 to data store 5. The stored data is later used by processor 3 to compare with response data from an unknown source in an unknown location for determination of its location. When the unknown response data is compared with stored response data from many known locations, the stored location data from acceptably matching stored response data identifies the location of the unknown source. That location data from a plurality of unknown sources may be used by the data processor in a repetitive process to build up an image in image display means 7 of the distribution of radiation emitting material in a distributed radiation source such as a radioactive tracer in a patient in front of collimator 9. The photon detector 2 includes a collimator 9, a large area, thin, scintillation crystal 10, having transparent window 11, optional shaped light pipe 12, a plurality of photomultiplier tubes (PMT) 13. Calibration source 4 is a uniformly distributed thin layer of radioactive material closely applied to the surface of lead collimator 9 having parallel holes 14 therethrough. Most individual photons from the source pass through holes 14 and impinge upon crystal 10 producing radiation response data which are processed and then stored in data store 15.

Calibration method for locating the source of a photon producing characteristic radiation response data such as PMT signal patterns and total pulse height when the source is part of a uniformly distributed source.

The real physical location of each hole 14 in collimator 9 is either provided by the manufacturing process or determined by means such as optical scanning. These real hole location data are fed into data store 5. These data should not change unless there has been some physical damage. Absent damage, these data should not change. Collimator position fixing tapered pin system 16 of peripherally located pins establishes reproducible collimator position relative to detector 2 so that collimators may be changed without requiring recalibration. Many calibration responses (e.g. a million) are stored with uniform sheet source 4 in place. Moving apparatus 15 may be provided to move source 4 in its plane to average out any non uniformities in the source, using well known mechanisms such as those employed in orbital sanding machines. A first approximate X,Y location (a) is assigned to each response by application of common positioning methods such as the Anger method which assigns a location in the X direction by adding fixed fractions of all PMT signals wherein the fractions are determined by the X location of each PMT. The location in the Y direction is assigned by adding fixed fractions of all PMT signals, wherein the fractions are determined by the Y location of each PMT. This process may be analog or digital. An image built up of these million location points would display a hot spot or concentration of points for each collimator hole separated by colder areas corresponding to regions of the crystal shielded by the lead septa. Because of all the distortions and approximations in the process, the hot spots will not be spaced uniformly nor located accurately at collimator holes and there will not be sharp separation of holes and septa. The X, Y value of the center (b) of each hot spot is next determined, e.g. by using a centroid seeking algorithm. The first approximate X, Y location of each stored response (a) is next compared to the location of the proximate hot spots centers to determine the closest one, i.e. x,y values of each (a) is compared to x,y values of (b)s to find the closest fit, and the X, Y value of the closest center is assigned as the second approximate x,y location of the stored response in place of the first approximate location. All of the responses assigned to a particular second approximate location, i.e. all of the (a)s which now share the x,y value of a common (b) are clustered together and analyzed by frequency distribution and statistical analysis. Outlying and non representative signal patterns such as those generated by Compton interaction within the crystal and the occasional deviant signal resulting from the statistical nature of the interactions may now be discarded. For each second approximate location, characterisitc signal patterns most likely to occur when a source is centered over a collimator hole are thereby determined along with ranges of deviation therefrom as the pattern becomes less probable or the result of interactions in the crystal removed from the center of the hole. This enables software to increase resolution at the expense of sensitivity by rejecting more peripheral events when required. Each second approximate location is now matched to and replaced by an X, Y value stored in memory representing the true location of the collimator hole through which the radiation passed in generating those patterns. Second approximate locations are readily matched to true locations of collimator holes by a computer process because they will be in the same sequence as the collimator holes but displaced by the non uniform physical processes which distort the images of today's cameras.

SAMPLE FLOW CHART OF CALIBRATION PROCESS

STEP A

Record in data memory, real physical center of each collimator hole in sequence, starting with lowest, far left hole.

$X_o, Y_o$: 0 mm X; 0 mm Y
$X_1, Y_o$: 3.2 mm X; −0.2 mm Y
$X_2, Y_o$: 6.3 mm X; 0.1 mm Y, etc.

X,Y position values stored may be translated into relative locations in display matrix.

STEP B

Uniform radioactive calibration source radiates photons through collimator, each scintillation event in crystal generates a PMT signal set. Whenever sum of signals from an event passes discriminator, for that event.

STEP C

Record X,Y values off analog Anger circuits (referred to as "first approximate location") also each of 61 individual PMT signal values.

STEP D

Sort and order the PMT signal values within a signal set, discarding the low signals and arranging the remaining signals in descending order of amplitude. Record in data storage for each event includes X,Y "first approximate location", set of nine PMT signal values in descending order with each PMT identified, and sum signal.

STEP E

In an image matrix, position as a single count each and every recorded calibration event according to its first approximate X,Y location.

STEP F

Display the resulting image on a screen. The operator, using a light pen and zoom screen expansion, encloses each "hot spot" or region of concentration with the pen, thereby separating events in crystal area beneath a hole (concentrated population) from area between holes (sparse population) and clustering together events from photons presumably passing through a common hole which should have a common X,Y position.

Alternate STEP $F_2$

Use edge enhancement/edge detection programs to enclose areas of concentrated populations in image matrix between regions of sparse populations.

STEP G

Applying a centroid seeking algorithm to the X,Y values of all events clustered together in each enclosed area of concentrated population as delineated in $F_1$ or $F_2$, find the X,Y location of the centroid (center of population) of each area.

STEP H

Compare the "first approximate X,Y value" recorded for each event in step B with X,Y values of centroids found in step G to find the nearest one (e.g. by a least squares fit). Replace the "first approximate location X,Y values" recorded for each event with this closest centroid X,Y value, which may be referred to as "second approximate location" of the event.

STEP I

Cluster or combine together for analysis all of the events sharing a common second approximate location. Perform a statistical analysis upon the PMT signal values of the clustered events to derive measures of central tendency and deviation of the PMT signal pattern generated by radiation passing through a collimator hole. Statistical analysis may be as simple as deriving the mean and standard deviation of each PMT signal. From these data may be derived acceptability criteria such as: acceptability range for a PMT signal shall be mean value ±N times the standard deviation.

STEP J

By starting at one corner of the collimator and moving sequentially one hole at a time, find the real X,Y value for each collimator hole recorded in Step A which corresponds to each "second approximate X,Y location" recorded for every centroid, and substitute these values in the calibration record.

Because this pattern matching process overcomes non-uniformity distortions which degrade other positioning methods, non-uniform mechanisms which also improve system performance can be used to advantage by the present invention. The shaped light pipe 12 may also form the transparent window 11 of the crystal and have a total thickness less than conventional cameras which relay upon a thick light pipe to smooth response. The reflecting surfaces 17 of the crystal and light pipe may be of a specular (mirror) nature applied directly to the surfaces for greater directionality of light than the diffusing and smoothing white powder reflectors of prior art. The PMT array may be rectangular rather than the more closely packed hexagonal array of prior art. Rectangular array is better suited to a rectangular crystal and field of view which in turn is better suited to human anatomy. The hexagonal array was a constraint forced on the prior art by non-uniformity limitations of the rectangular array. The shaped face 19 of light pipe 12 may take the form of rectangularly packed truncated cones whose apices have been cut to an area matching the photocathode area of the PMT's. This structure allows more light to be directed to proximal photocathodes to increase positioning information. The inherently uniformity correcting nature of the pattern matching process allows these means of increasing positioning signal information to be employed without the danger of distorting the final image. FIG. 2 shows an embodiment of a signal processor of the invention. Each PMT 20 is connected via preamplifier 21 to two pathways. In a first path, adder 22 adds all the pulses and feeds the sum pulse to discriminator 23 which actuates control 24 which enables multiplexer 29 only when the sum pulse exceeds a predetermined level set in the discriminator. In a second signal path, each signal is delayed in delay 25 long enough for discriminator 23 to perform its function on the same pulse. The signal then passes to an integrate and hold means 26. All the integrate and holds are held at zero by control 24 acting through multiplexer 29 except when an acceptable sum pulse actuates discriminator 23. The integrated and held pulses are then digitized and processed by multiplexer 29 and analog to digital converter 30 under operation of control 24. Accessory integrate and hold 27 may be switched in serially to buffer the input and thereby increase the system response rate. The fraction of the decaying light pulse in the crystal used for signal is controllable by the duration of the enabling of integrate and hold means 26 by control 24 to trade between resolution and response rate. Computer 3 and store 5 process the digital data. The data processing task may be greatly reduced and accelerated by sorting and ordering the PMT signals in the pattern so as to firstly discard the smaller signals which contribute to positioning more noise than signal, and to secondly arrange the remaining signals in descending order of amplitude. These processes may be performed in analog or digital form or a combination thereof. FIG. 3 shows a square array of PMT's 31 positioned against a crystal 32. Individual signals generated by the PMT's from a scintillation are indicated by the numbered letters within the circles. FIG. 4 shows how all 16 of the signals 33 are compared simultaneously in a first set of comparators 34 in a first step to discard the 8 weakest signals. The eight remaining signals 35 are compared in a second set of comparators 36 to select the four strongest signals. The four strongest signals now remaining are rearranged by another set of comparators into a descending order of amplitude. The binary switch position of each comparator at the conclusion of the comparison process is fed to the computer to indicate which signals were selected and their final order. For example, in FIG. 3, a scintillation occurring at X generates PMT signals which are sorted and ordered by the comparator process of FIG. 4 resulting in the descending order of selected signals B3/A4/C1/D4. This order will only occur in the triangular area 37. Only the signal patterns in that portion of the calibration memory defined by this order need be searched when an unknown pattern is to be matched. And each pattern is only four signals wide instead of sixteen. The number of calibration patterns which need be searched can be further reduced by selecting only those whose B3 value is close to the B3 value of the unknown pattern. The calibration patterns are arranged in order in memory so that the order and a certain range of values of the highest signal, for example, constitutes an address in memory. Not shown is another stage which adds all the signals together for total pulse height information. Multivariate pattern recognition programs such as Arthur (Research/Development Feb. 1878, Page 52) may be used to make the final decision on which is the closest matching pattern and whether it is acceptably close.

When the sorting and ordering process is applied to the calibration signals it reduces the data processing task here as well. Having clustered all of the patterns probably representing a source over a collimator hole, statistical processes are applied to select a pattern most representative of a photon impinging the crystal directly beneath the center of that hole. This may be done, for example, by frequency distribution analysis of individual PMT signals to find the most frequently occurring value of each PMT signal, and these found values will represent the PMT signal pattern which is most representative of radiation passing through that hole. First consider the exceptional case wherein the collimator hole and scintillating crystal are directly over the effective center of a PMT photocathode. The signal from that PMT will be maximum and any deviation from that location will yield a lower signal. When analysis of a signal pattern reveals that one PMT signal is at the maximum value found anywhere, then that signal value may be taken as the central value. In other much more common situations, the signal will remain relatively unchanged as the event moves tangentially to the effective photocathode center and will increase or decrease as the event moves radially toward or away from the effective photocathode center. A frequency distribution analysis of the signals finds a signal value intermediate the high and low values to represent the most likely value of the signal at the center of the hole. This is done for each PMT remaining in the pattern after sorting and ordering. Measured deviations from that central value may also be stored so that acceptability limits may be programmed and changed in software to trade off between resolution and sensitivity as required by different clinical situations. Also stored in calibration memory may be total pulse height data and field uniformity data.

FIG. 5 shows a portion of a detector with a parallel hole collimator 39, having lead septa 43, holes 44, 46, 47 and crystal 40 with window 41 and PMT 42. Photons 45 from a distant source centered over hole 44 strike the crystal under that hole as shown if there is no septal penetration. Photons 49 from the same source pass through adjacent hole 46 to strike the crystal. Scintillations here falsely locate the source. Photons 50 from the same source pass through twice removed hole 47 to strike the crystal and falsely locate the source by a greater error. Hexagonally packed holes have six adjacent holes 46 and twelve twice removed holes 47 for every central hole 44. Septal penetration further increases the proportion of false rays striking the crystal. Limiting acceptance to patterns generated in the shaded areas 51 of the crystal by methods of the present invention eliminates more of the false photons than the true photons, thereby improving system resolution at a distance.

In yet another embodiment of the invention for calibration without a collimator in place, the calibration source comprises a web 4 of FIG. 1 holding a set of invisible generally uniformly spaced spots containing generally uniform amounts of radioactive material in known locations. The moving device 15 is not employed in this embodiment since spot positions must be fixed in space. The computer stores these known source locations and uses this information in the calibration process in the same general fashion as set forth above for using the known locations of the collimator holes when calibrating with a uniform sheet source against a parallel hole collimator. This calibration process is inherently uniformity correcting but it cannot improve system resolution at a distance by selection of patterns limited to that portion of the crystal at the center of a collimator hole.

The above described data processing may be performed in analog mode, in digital mode or combinations thereof. The above data processing steps may be in hardware, in firmware or in software or in combinations thereof.

Inasmuch as the present invention is subject to many variations, modifications and changes in detail, it is intended that all matter described above or shown in the accompanying drawings be interpreted as illustrative and not in a limiting sense.

What is claimed is:

1. A system for imaging a distributed source emitting photons with scintillation means in the path of said photons to provide light indications and a plurality of photodetector means viewing said light indications in said scintillation means comprising: signal processing means connected to said photodetector means for processing photodetector signal responses to said light indications; data processing means; data storage means; connecting means interconnecting said signal processing means with said data processing means and said storage means; said storage means is for storing known source location data and a plurality of response data generated from said photodetector means when said scintillation means was engaged by emissions from sources in known locations; said data processing means including means for comparing response data from a source in an unknown location with said stored response data from sources in known locations to determine degree of matching and thereby the location of the unknown source from the stored known source location data of the matching stored response data when and if an acceptable correlation is found; calibration means for providing to said storage means said plurality of response data from sources in known locations including, (a) calibration radiation source means so disposed as to irradiate said scintillation means at a plurality of locations simultaneously, (b) a first approximate locating means for recording a first approximate location of each calibration response data on the basis of the relative position of each photodetector means and the signal thereon, (c) center locating means for analyzing a plurality of first approximate locations from a plurality of calibration radiations to determine the locations of a plurality of centers of concentrations of said first approximate locations when calibration scintillations are not uniformly distributed in said scintillation means, (d) a second approximate locating means for recording a second approximate location of each calibration response data to correspond to the location of that center which is in closest proximity to said first approximate location, and selection means for optionally discarding certain of the response data on the basis of their differences from other response data sharing a common location.

2. The invention of claim 1 wherein said data processing means includes means for determining deviations and central tendencies of response data for acceptability decision criteria.

3. The invention of claim 1, wherein said response data further includes total pulse height data for pulse height selection analysis.

4. The invention of claim 1, wherein said calibration radiation source means further includes web means supporting a plurality of generally uniform spots of photon emitting material in known discrete locations, and said storage means includes calibration spot location data, and said data processing means includes means for replacing second approximate location data assigned to said calibration response data with corresponding calibration spot location data.

5. The invention of claim 1, wherein said calibration radiation source means includes: a generally uniform source of photon emitting material; collimator means of radiation opaque material having holes therethrough, interposed between said photon emitting material and said scintillation means; and said storage means includes collimator hole location data; and said data processing means includes means for replacing said second approximate location data assigned to said calibration response data with corresponding collimator hole location data.

6. The invention of claim 5, wherein said data processing means includes means for improving system resolution at a distance from said collimator means by selectively rejecting response data records determined by comparison with stored representative calibration response data records, deviations therefrom and central tendency data to more probably have resulted from photons incident on the crystal at the periphery of a collimator hole than on the crystal at or near the center of a collimator hole.

7. The invention of claim 5 including reproducible positioning means to reproducibly position said collimator means relative to said scintillation means.

8. The invention of claim 5 including source moving means to move said source within its plane to average out any lack of uniformity of said source.

9. The invention of claim 1 wherein said data processing means includes sorting means for comparing relative magnitudes of photodetector signals and for discarding weaker signals and ordering means for comparing the relative magnitude of remaining stronger signals to arrange said signal data in order by size of each photodetector signal to provide improved radiation response data records allowing storage of calibration data in a smaller and more readily accessible form, thereby reducing the number of calibration patterns which need to be compared to an unknown pattern to find a possible correlation.

10. The invention of claim 9, wherein said order of photodetector signal size is used as an address in said storage means for selection of calibration patterns to possibly match to an unknown pattern.

11. The invention of claim 1, wherein scintillation means has transparent window means interposed between said scintillation means and said plurality of photodetector means, said window means having a flat surface adjacent said scintillation means and a formed surface adjacent said photodetector means in the shape of packed truncated cones whose cut apices generally correspond to and are optically coupled to the photosensitive areas of said photodetector means.

12. The invention of claim 1, wherein said scintillation means has light reflecting surfaces for directing said light indications to said photodetector means, said light reflecting surfaces comprising specular reflective coating means for improved light directing.

13. The invention of claim 1, wherein said photodetector means are disposed in a generally rectangular array.

14. In a scintillation camera system employing a plurality of characteristic photodetector signal pattern data from sources in known locations over collimator holes, the calibration process comprising the steps of:

(a) recording collimator hole location data, (b) recording individual response data while a photon emitting source irradiates scintillation means through a plurality of said collimator holes simultaneously, (c) determining and recording a first approximate location for each response of step (b) from the relative position of each photodetector and the amplitude of the signal thereon, (d) determining and recording a plurality of common second approximate locations using centers of frequency of occurrence of distributions of first approximate locations of step (c), (e) assigning each response to the second approximate location of step (d) determined to be nearest its first approximate location, (f) determining and recording for each second approximate location the correct corresponding collimator hole location of step (a), (g) analyzing all of the response data assigned to a common second approximate location or collimator hole location to provide for each location, response pattern data characteristic of photons most probably engaging said scintillation means directly beneath said collimator hole and statistical data indicating deviations therefrom, and (h) recording characteristic response pattern data and deviation data of step (g) together with assigned collimator hole location data of step (f).

* * * * *